United States Patent [19]

Zhang

[11] Patent Number: 5,355,324
[45] Date of Patent: Oct. 11, 1994

[54] DETECTING LEAKAGE OF FLUID FROM A CONDUIT

[75] Inventor: Xue Jun Zhang, Amsterdam, Netherlands

[73] Assignee: Shell Oil Company, Houston, Tex.

[21] Appl. No.: 926,428

[22] Filed: Aug. 10, 1992

[30] Foreign Application Priority Data

Nov. 6, 1991 [EP] European Pat. Off. ......... 91310267.9

[51] Int. Cl.$^5$ ............................................. G01M 3/28
[52] U.S. Cl. .................................. 364/510; 340/605; 73/40.5 R
[58] Field of Search ..................... 364/509, 510, 554; 73/40, 40.5 R; 340/605

[56] References Cited

U.S. PATENT DOCUMENTS

| | | | |
|---|---|---|---|
| 4,727,748 | 3/1988 | Horigome et al. | 73/40 |
| 4,796,466 | 10/1989 | Farmer | |
| 5,272,646 | 12/1993 | Farmer | 364/509 |

FOREIGN PATENT DOCUMENTS

58-120143 7/1983 Japan.

OTHER PUBLICATIONS

U. Jedner et al., "Comparison of Methods for Detecting Leaks in Pipelines," 58, No. 11, Munchen, DE (Nov. 1991).
Wald, A. and J. Wolfowitz, "Optimum Character of the Sequential Probability Ratio Test", *Annals of Mathematical Statistics*, 19 (1948), pp. 327–339.
Wald, A. *Sequential Analysis*, Dover Publications, New York, New York, 1947, Chapter 3, "The Sequential Probability Ratio Test for Testing a Simple Hypothesis $H_0$ Against a Single Alternative $H_1$", pp. 37–57.

*Primary Examiner*—Thomas G. Black
*Assistant Examiner*—Michael Zanelli
*Attorney, Agent, or Firm*—Fred S. Reynolds, Jr.

[57] ABSTRACT

A method is provided to detect leakage from a conduit through which a stream of fluid flows and to indicate when there is a leakage condition or a no leakage condition. The method includes measuring at least one variable of a group consisting of fluid pressure and fluid flow rate over a period of time and at least one location of the stream to provide a data set representing the variable at the location and over the period of time. A statistical probability of obtaining the data set from the measurement under a first hypothesis that no leakage occurs is determined and a statistical probability of obtaining the data set from the measurement under a second hypothesis that leakage occurs is determined. One of the hypotheses is selected as being true if the probability of obtaining the data set from the measurement under the selected hypothesis is larger than the probability of obtaining the data set from the measurement under the other hypothesis. Should the second hypothesis be selected, a signal is initiated which provides an alarm to indicate that a leakage condition exists. Should the first hypothesis be selected a signal is initiated which indicates that a no leakage condition exists. In some embodiments of the invention, sequential probability ratio tests are used to determine the selected hypothesis.

17 Claims, 1 Drawing Sheet

DETECTING LEAKAGE OF FLUID FROM A CONDUIT

FIELD OF THE INVENTION

The invention relates to detection of leakage of fluid from a conduit through which a stream of fluid flows. The conduit can, for example, form part of a network for distributing gas or liquid, or form part of a plant for processing hydrocarbons.

BACKGROUND OF THE INVENTION

Generally, the occurrence of a leak should be detected at an early stage in order to limit the risks involved with the leak, especially when inflammable fluids are transported through the conduit. Furthermore, damage to environment or equipment due to leaking fluid can be limited or prevented if the leak is detected at an early stage.

In a known method to detect leakage of fluid from a pipeline, a mass balance technique is used which involves measuring the inlet and outlet flow rates, and comparing the flow rates in order to check the fluid mass balance in the pipeline.

In another known method, a statistical distribution of variations of fluid pressure or fluid flow rate during development of a leak is assumed. This method aims to detect leaks from measurements of pressure at selected intervals along the pipeline, which measurements are compared with the assumed statistical distribution. A disadvantage of the known methods is that alarms are often generated in case of no leakage, or no alarms are often generated in case of leakage, especially during varying operating conditions.

SUMMARY OF THE INVENTION

It is an object of the invention to provide a reliable method to detect leakage of fluid from a conduit, which method overcomes the disadvantages of the known methods.

It is a further object of the invention to provide a reliable device for detecting leakage of fluid from a conduit.

A method is provided to detect leakage from a conduit through which a stream of fluid flows, the method comprising measuring at least one variable of the group consisting of fluid pressure and fluid flow rate over a period of time and at least one location of the stream to provide a data set representing the variable at said location and over said period of time. A statistical probability of obtaining said data set from the measurement under the hypothesis that no leakage occurs is determined and a statistical probability of obtaining said data set from the measurement under the hypothesis that leakage occurs is determined. One of said hypothesis is selected as being true if the probability of obtaining said data set from the measurement under said hypothesis is larger than the probability of obtaining said data set from the measurement under the other hypothesis.

These and other objects and advantages of the present invention will no doubt become apparent to those of skill in the art after having read the following detailed description of the preferred embodiments which are contained herein.

The invention encompasses the heretofore described embodiments as well as other embodiments as are described hereinafter and as will be apparent to those of skill in the art.

DETAILED DESCRIPTION OF PREFERRED EMBODIMENTS

Figure 1:
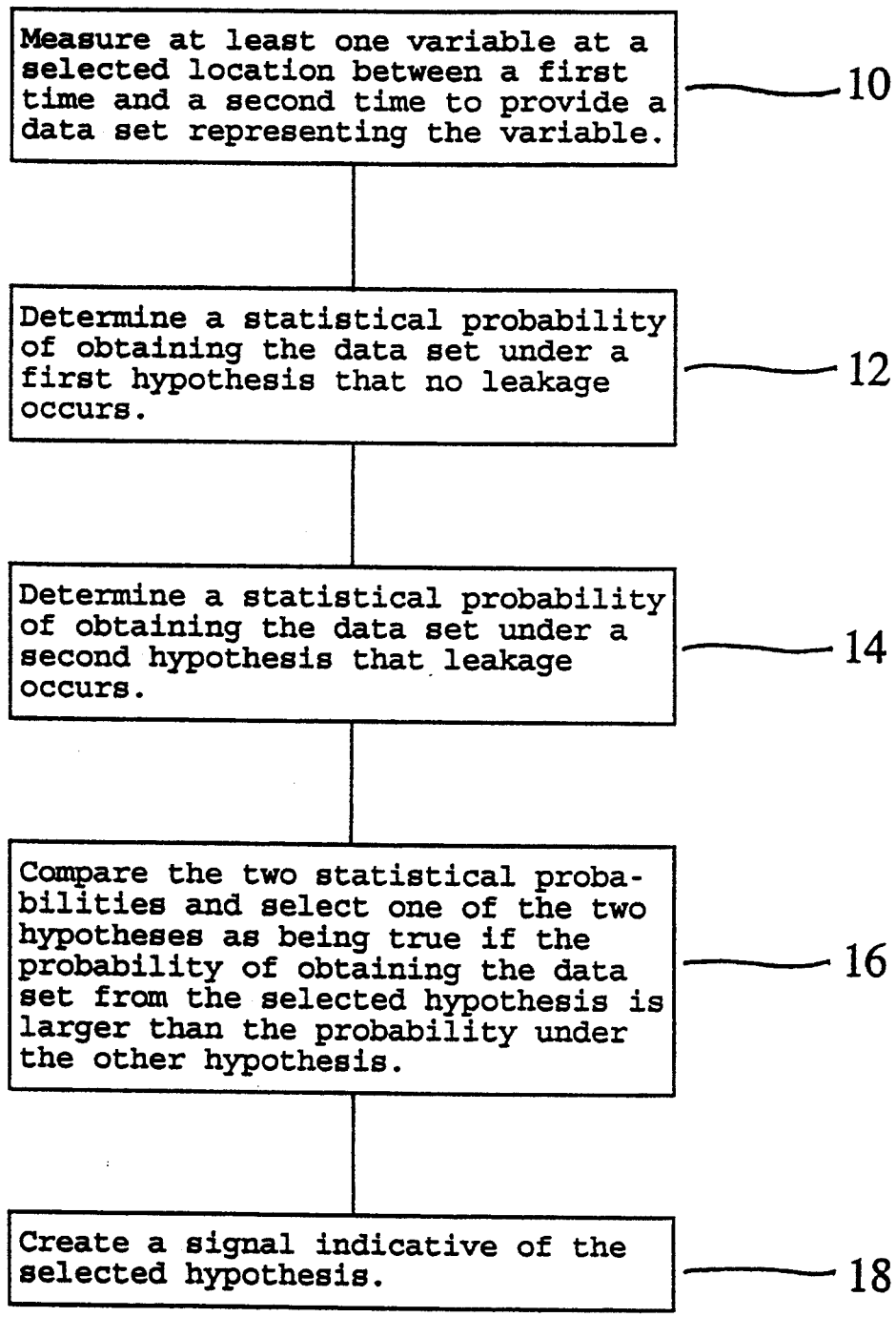
FIG. 1 is a block diagram of one embodiment for practicing a method of the invention at a single location.

In accordance with the invention as shown in FIG. 1, there is provided a block diagram of one embodiment of a method to detect leakage from a conduit through which a stream of fluid flows, the method comprising:

measuring at least one variable of the group consisting of fluid pressure and fluid flow rate between a first and a second time and at a location of the stream, to provide a data set representing the variable at said location and between said first and second times (step 10);

determining a statistical probability of obtaining said data set from the measurement under the hypothesis that no leakage occurs (step 12) and a statistical probability of obtaining said data set from the measurement under the hypothesis that leakage occurs (step 14);

selecting one of said hypothesis as being true if the probability of obtaining said data set from the measurement under said selected hypothesis is larger than the probability of obtaining said data set from the measurement under the other hypothesis (step 16); and creating a signal indicative of the selected hypothesis (step 18). By using statistical probabilities for the selection of said one hypothesis it is achieved that variations, for example due to operational changes or fluid hold up in the conduit can be distinguished from the occurrence of a leak.

The device according to the invention comprises:

means for measuring at least one variable of the group consisting of fluid pressure and fluid flow rate between a first and a second time and at a location of the stream to provide a data set representing the variable at said location and between first and second times;

means for determining a statistical probability of obtaining said data set from the measurement under the hypothesis that no leakage occurs and a statistical probability of obtaining said data set from the measurement under the hypothesis that leakage occurs; and means for selecting one of said hypothesis as being true if the probability of obtaining said data set from the measurement under said hypothesis is larger than the probability of obtaining said data set from the measurement under the other hypothesis.

In a preferred embodiment of the invention said location forms a first location, said data set forms a first data set, and the method comprises the further steps of:

measuring said variable between said first and second time and at a second location of the stream to provide a second data set representing the variable at the second location and between said first and second times;

determining a statistical probability of obtaining the second data set under the hypothesis that no leakage occurs and a statistical probability of obtaining the second data set under the hypothesis that leakage occurs; and selecting said one hypothesis as being true if the probability of obtaining each data set under said hypothesis is larger than the probability of obtaining the data set under the other hypothesis. It is thereby achieved that the effects of operational changes on the detection of a leak are further eliminated, and that, for example, a time lag between an increase of the mass flow rate at an inlet of the conduit and at an outlet thereof is taken into account.

To provide a reliable statistical calculation procedure, the step of determining said probabilities of obtaining each data set comprises selecting a statistical distribution of the variable at the location pertaining to the data set under the hypothesis that no leakage occurs and selecting a statistical distribution of the variable at said location under the hypothesis that leakage occurs, the statistical distributions being similar to each other but having different mean values.

Accurate statistical representation of the variable is achieved when said statistical distributions are gaussian distributions having substantially equal variances.

Preferably the steps of determining said probabilities and selecting said one hypothesis are carried out using Wald's sequential probability ratio test (SPRT) as described in Wald A., "Sequential analysis" Dover Pub Inc., 1947; and in Wald A., Wolfowitz, J., "Optimum character of the sequential probability ratio test" Ann Mathematical Statistics, 19, 1948.

The sequential probability ratio test (SPRT) will now be discussed briefly and by way of example only. In order to determine whether a leak has occurred in a pipeline system which can operate under normal condition or under leakage condition, the following hypotheses are constructed: hypothesis $H_0$ implying that the system is under normal operation; hypothesis $H_1$ implying that the system is under leakage operation. Successive observations of said at least one variable of the group consisting of fluid pressure and fluid flow rate are denoted as $y_1, Y_2, \ldots, Y_t$, where t indicates the sampling number.

Assume that the probability of observing $y_1, \ldots, y_t$ is given by $P_0(t)$ when $H_o$ is true and by $P_1(t)$ when $H_1$ is true. At the $t^{th}$ sampling step, the logarithm of the probability ratio $$\lambda(t) = \ln \frac{P_1(t)}{P_0(t)} \quad (1)$$

is computed and a decision is made as follows:
If $\lambda(t) \geq A$, then terminate the observation and accept $H_1$.
If $\lambda(t) \leq B$, then terminate the observation and accept $H_0$. Otherwise continue the observation.

The constants A (A>0) and B (B<0) are determined by the prescribed test strength $(\alpha, \beta)$, where
$\alpha$ is the false alarm (alarm in case of no leak) probability.
$\beta$ is the missed alarm (no alarm in case of a leak) probability.
The relationship between A, B and $\alpha$, $\beta$ is:

$$A \leq \ln \frac{1-\beta}{\alpha} \quad (2)$$

$$B \geq \ln \frac{\beta}{1-\alpha} \quad (3)$$

The upper limits of $\alpha$ and $\beta$ for fixed values of A and B are given by $$\alpha \leq e^{-A} \quad \beta \leq e^B \quad (4)$$

Therefore the false alarm and missed alarm probabilities can be controlled by adjusting the thresholds A and B. To choose the values of A and B in practice, it is sufficient to assume equality in (2) and (3).

When a leak develops in a pipeline, the fluid flowrate and pressure will generally change, starting from the location of the leak and propagating toward the inlet and outlet of the pipeline. In case of steady state flow conditions prior to leakage, the flow variables change until a new steady state condition occurs. It is to be understood that fluid flowrates and pressures subjected to random fluctuations also represent steady state flow conditions, at least as long as such variables can be characterized by a statistical distribution, for example a gaussian distribution. For such steady state flow conditions the hypothesis testing problem can be constructed as follows:

1) $H_o$: $M_1$ is gaussian with mean $m_1$ and variance $\sigma_1^2$.
   $H_1$: $M_1$ is gaussian with mean $m_1 + \Delta m_1$ and variance $\sigma_1^2$.
2) $H_0^*$: $M_2$ is gaussian with mean $m_2$ and variance $\sigma_2^2$.
   $H_1^*$: $M_2$ is gaussian with mean $m_2 - \Delta m_2$ and variance $\sigma_2^2$.

Where $M_1$ and $M_2$ are the mass flow rates at the inlet and at the outlet, $\Delta m_1$ and $\Delta m_2$ are the expected minimum changes of $m_1$ and $m_2$ caused by a leak.

A leak detection scheme can be obtained by applying Wald's SPRT to hypothesis testings $H_0$, $H_1$, and $H_1^*$, $H_1^*$ respectively. A leak alarm is generated only if both $H_1$ and $H_1^*$ are accepted simultaneously.

For the testing of the above hypothesis $H_1$ against $H_0$, equation (1) can be transformed into a simple recursive form:

$$\lambda_1(t) = \lambda_1(t-1) + \frac{\Delta m_1}{\sigma_1^2}\left(M_1(t) - m_1 - \frac{\Delta m_1}{2}\right) \quad (5)$$

Similarly for testing of hypothesis $H_1^*$ against $H_0^*$, we have:

$$\lambda_2(t) = \lambda_2(t-1) - \frac{\Delta m_2}{\sigma_2^2}\left(M_2(t) - m_2 + \frac{\Delta m_2}{2}\right) \quad (6)$$

Therefore at every sample step t, a decision is made by comparing $\lambda_1(t)$ and $\lambda_2(t)$ with the threshold values A and B. It is possible to set different thresholds for $\lambda_1(t)$ and $\lambda_2(t)$. The above leak detection scheme can be modified for other boundary conditions by testing different combinations of variables.

Once a leak has been detected, the leak size can be estimated using the corrected mass balance technique which involves determination of a difference between the inlet and outlet flow rates while the variation of the fluid hold up in the pipeline is taken into account. The fluid hold up can be determined for example from temperature and pressure measurements along the pipeline.

The leak can be localized by applying the least squares algorithm to the steady state equation relating the measured fluid flow rates and pressures to the leak location. The leak location $X_L$ can be estimated using the following equation:

$$\tilde{P}_1(t) - \tilde{P}_2(t) - K.L.\tilde{M}_2^2(t) = K.(\tilde{M}_1^2(t) - \tilde{M}_2^2(t)).X_L \quad (7)$$

where $\tilde{P}_1$ and $\tilde{P}_2$ are the on-line calculated sample means of the pressure measurements at the inlet and the outlet of the pipeline respectively;

$\tilde{M}_1$ and $\tilde{M}_2$ are the on-line calculated sample means of the mass flow measurements at the inlet and the outlet of the pipeline respectively;

L is the length of the pipeline;

K is a constant determined by the friction factor, fluid density and pipeline diameter. K is estimated using the flow and pressure measurements before leak detection is started.

In case the flow conditions do not represent a steady state condition, for example, due to strongly varying operating conditions, generally a time delay occurs between changes of the flow conditions at the inlet and at the outlet of the pipeline. The following equation can be used to calculate the probability ratio $\lambda(t)$ for such non-steady state conditions:

$$\lambda(t) = \lambda(t-1) + \frac{\Delta m}{\sigma^2} \cdot \left( Z(t) - m - \frac{\Delta m}{2} \right) \quad (8)$$

where

Z(t) represents the difference between the inlet flowrate and the outlet flowrate taking into account said time delay, i.e. $Z(t) = M_1(t) - M_2(t')$, t indicating a first sampling number and t' indicating a second sampling number at said time delay after the first sampling number.

The hypothesis testing scheme for leak detection is then:

$H_0$: Z is gaussian with mean m and variance $\sigma^2$ $H_1$: Z is gaussian with mean $m + \Delta m$ and variance $\sigma^2$ where m is the mean difference between the inlet and outlet flow rate before occurrence of a leak, $\Delta m$ is the minimum leak rate to be detected and $\sigma^2$ is the variance of the distribution of Z. At each sample step, $\lambda(t)$ is compared with the threshold value A and an alarm is generated as soon as $\lambda(t)$ becomes greater than or equal to A. A similar scheme can be used in case the measured variable is the fluid pressure. Then Z(t) represents the difference between the fluid pressure at the inlet and at the outlet, taking into account said time delay.

The invention will now be further illuminated in the following two examples:

EXAMPLE 1

The scheme of equations 5 and 6 was applied to detect two occurrences of leakage in a 100 km long pipeline of internal diameter 50 cm, and operating at randomly varying pressure and flowrate conditions. The operating conditions were as follows:

fluid flowing through the line: air;
temperature of fluid: 290 K.;
Moody friction factor: 0.02;
inventory variation: 50% of average mass flowrate;
sampling intervals: 35 seconds;
simulation period: 3 hours;
SPRT test strength: $\alpha = 0.05$; $\beta = 0.05$;
thresholds: A = 2.944; B = 2.944;
measured variables: mass flowrate and pressure at inlet and outlet.

The average inlet pressure was 55 bar, and the average outlet pressure was 48 bar. The average mass flowrate was 29 kg/s.

A first leak of 12% mass flow loss was simulated at location x = 20 km from the inlet and at time t = 0.4 hrs. The leak was detected using Wald's sequential probability ratio test at time t = 1.8 hrs, the time delay in detection being 1.4 hrs. After detection of the leak, the corrected mass balance technique, based on the flow and pressure measurements at the inlet and outlet was applied to estimate the size of the leak. The estimated leak rate in the last sampling period was 3.13 kg/s. Since the actual leak size was 12%, i.e. 3.48 kg/s, the estimation accuracy was 90%. The estimated position of the leak was x = 22 km from the inlet as determined with the least squares algorithm, the accuracy thereof being 98%.

A second leak of 1.1% mass flow loss was simulated at location x = 50 km from the inlet and at time t = 0.4 hrs. This leak was detected using Wald's sequential probability ratio test at time 2.1 hrs, the time delay in detection being 1.7 hrs. The mass balance technique failed to estimate the leak size because the leak was very small relative to the inventory variations. The least squares algorithm was used to localize the leak, which algorithm converged to leak location x = 55 km from the inlet, the accuracy of the estimation being 95%.

EXAMPLE 2

The scheme of equation 8 was applied for both flowrate measurements and pressure measurements to detect four leaks simulated in a 37 km long pipeline of diameter 10 cm, and operated to transport liquefied propylene at varying operating conditions. During normal operation the mass flowrate varies between 200–320 tons/day, the inlet pressure varies between 15–22 bar, and the outlet pressure varies between 10–11 bar. The results of the leak detection scheme are shown in Table 1:

TABLE 1

| Leak No. | 1 | 2 | 3 | 4 |
|---|---|---|---|---|
| Leak size (% of nominal flowrate) | 10% | 5% | 2% | 1% |
| Measured leak size (% of nominal flowrate) | 9.26% | 4.8% | 1.83% | 1.01% |
| Detection time (minutes) | 1.7 | 1.9 | 3.7 | 12.5 |
| Localization error | 0.6% | 13.6% | 14.0% | 20.8% |
| Leakrate estimation error | 6.9% | 10.0% | 20.8% | 8.5% |

While several embodiments of the invention have been shown and described, it will be understood that the invention is not limited thereto since many modifications may be made and will become apparent to those skilled in the art.

What is claimed is:

1. A method to detect leakage from a conduit through which a stream of fluid flows and to indicate when there is a leakage condition or a no leakage condition on the conduit, comprising:

measuring at least one variable of a group consisting of fluid pressure and fluid flow rate between a first and a second time and at a location of the stream flowing through the conduit to provide a data set representing the variable at said location and between said first and second times;

determining a statistical probability of obtaining said data set from the measurement under a first hypothesis that no leakage occurs from the conduit and a statistical probability of obtaining said data set from the measurement under a second hypothesis that leakage occurs from the conduit;

selecting one of said hypotheses as being true if the probability of obtaining said data set from the measurement under said selected hypothesis is larger than the probability of obtaining said data set from the measurement under the other hypothesis; and creating a signal indicative of said selected hypothesis, wherein the signal initiates an alarm when the second hypothesis is selected to indicate the leakage condition on the conduit or said signal initiates a notice of normal operation for the conduit when the first hypothesis is selected to indicate the no leakage condition.

2. The method of claim 1 wherein the step of determining said probabilities of obtaining the data set comprises selecting a statistical distribution of the variable at the location pertaining to the data set under the first hypothesis that no leakage occurs and selecting a statistical distribution of the variable at said location pertaining to the data set under the second hypothesis that leakage occurs, the statistical distributions being similar to each other but having different mean values.

3. The method of claim 2, wherein said statistical distributions are gaussian distributions having substantially equal variances.

4. The method of claim 1, wherein said second hypothesis is selected as being true if the difference between the probability of obtaining the data set under said second hypothesis and the probability of obtaining the data set under the first hypothesis exceeds a minimum difference which is related to a selected false alarm probability.

5. The method of claim 1, wherein said first hypothesis is selected as being true if the difference between the probability of obtaining the data set under said first hypothesis and the probability of obtaining the data set under the second hypothesis exceeds a minimum difference which is related to a selected missed alarm probability.

6. The method of claim 1, wherein the steps of determining said probabilities and selecting said one hypothesis are carried out using a sequential probability ratio test.

7. The method of claim 6 wherein the sequential probability ratio test includes determining a logarithm of a ratio of the probability of the second hypothesis to the probability of the first hypothesis and selecting one of the two hypotheses as true when the logarithm exceeds values established by a strength test having preselected probabilities for a false alarm and a missed alarm, the second hypothesis being selected as true when the logarithm exceeds a positive value established by the strength test, and the first hypothesis being selected as true when the logarithm exceeds, in a negative direction, a negative value established by the strength test.

8. The method of claim 1, wherein if a leakage condition is indicated, a location of leakage is determined by solving a steady state equation relating said measured variable to said location of leakage, using a least squares algorithm.

9. The method of claim 1, wherein said location defines a first location, said data set forms a first data set, the method further comprising:

measuring said at least one variable between said first and second times at a second location of the stream to provide a second data set representing the variable at the second location and between said first and second times;

determining a statistical probability of obtaining the second data set under the first hypothesis that no leakage occurs and a statistical probability of obtaining the second data set under the second hypothesis that leakage occurs; and wherein the selecting step includes selecting said one hypothesis as being true if the probability of obtaining the first and second data sets under said selected hypothesis is larger than the probability of obtaining the data sets under the other hypothesis.

10. The method of claim 9 wherein the step of determining said probabilities of obtaining the first and second data sets comprises selecting a statistical distribution of the variable at each location pertaining to the location's data set under the first hypothesis that no leakage occurs and selecting a statistical distribution of the variable at each location pertaining to the location's data set under the second hypothesis that leakage occurs, the statistical distributions being similar to each other but having different mean values.

11. The method of claim 10 wherein said statistical distributions are gaussian distributions having substantially equal variances.

12. The method of claim 9 wherein said second hypothesis is selected as being true if the difference between the probability of obtaining each locations data set under said second hypothesis and the probability of obtaining each locations data set under the first hypothesis exceeds a minimum difference at each location which is related to a selected false alarm probability for the location.

13. The method of claim 9 wherein said first hypothesis is selected as being true if the difference between the probability of obtaining each location's data set under said first hypothesis and the probability of obtaining each location's data set under the second hypothesis exceeds a minimum difference at each location which is related to a selected missed alarm probability for the location.

14. The method of claim 9 wherein the steps of determining said probabilities and selecting said one hypothesis are carried out using sequential probability ratio tests.

15. The method of claim 14 wherein the sequential probability ratio tests include determining a logarithm of a ratio of the probability of the second hypothesis to the probability of the first hypothesis at each location and selecting one of the two hypotheses as true when the logarithm at each location exceeds values established by a strength test having preselected probabilities for a false alarm and a missed alarm at each location, the second hypothesis being selected as true when the logarithm at each location exceeds a positive value established by the strength test for that location, and the first hypothesis being selected as true when the logarithm at each location exceeds, in a negative direction, a negative value established by the strength test for that location.

16. The method of claim 9, wherein said first location is at an inlet of the conduit, and said second location is at an outlet of the conduit.

17. The method of claim 9, wherein if a leakage condition is indicated, a location of leakage is determined by solving a steady state equation relating said measured variable to said location of leakage, using a least squares algorithm.

* * * * *